United States Patent
Spilman

(10) Patent No.: US 9,935,951 B2
(45) Date of Patent: Apr. 3, 2018

(54) REMOTE BLIND HASHING

(71) Applicant: TapLink, Inc., San Jose, CA (US)

(72) Inventor: Jeremy Spilman, San Jose, CA (US)

(73) Assignee: Taplink, Inc., Wayland, MA (US)

( * ) Notice: Subject to any disclaimer, the term of this patent is extended or adjusted under 35 U.S.C. 154(b) by 277 days.

(21) Appl. No.: 14/689,439

(22) Filed: Apr. 17, 2015

(65) Prior Publication Data

US 2016/0044034 A1 Feb. 11, 2016

Related U.S. Application Data

(63) Continuation-in-part of application No. 13/944,743, filed on Jul. 17, 2013, now Pat. No. 9,021,269.

(60) Provisional application No. 61/673,185, filed on Jul. 18, 2012, provisional application No. 61/729,145, filed on Nov. 21, 2012.

(51) Int. Cl.
| | |
|---|---|
| *H04L 29/08* | (2006.01) |
| *H04L 29/06* | (2006.01) |
| *G06F 21/60* | (2013.01) |
| *G06F 21/62* | (2013.01) |
| *H04L 9/06* | (2006.01) |
| *H04L 9/32* | (2006.01) |

(52) U.S. Cl.
CPC ........ *H04L 63/0876* (2013.01); *G06F 21/602* (2013.01); *G06F 21/6209* (2013.01); *H04L 9/0643* (2013.01); *H04L 9/3226* (2013.01); *H04L 9/3239* (2013.01); *H04L 63/0485* (2013.01); *H04L 63/083* (2013.01); *H04L 63/0853* (2013.01); *H04L 2209/76* (2013.01)

(58) Field of Classification Search
CPC .... H04L 9/0643; H04L 9/3236; H04L 9/3239
See application file for complete search history.

(56) References Cited

U.S. PATENT DOCUMENTS

| | | | | |
|---|---|---|---|---|
| 6,859,795 | B1 * | 2/2005 | Zolotorev | G06Q 20/02 380/28 |
| 8,392,561 | B1 * | 3/2013 | Dyer | H04L 63/0281 455/466 |
| 2006/0265335 | A1 * | 11/2006 | Hogan | G06Q 20/20 705/65 |
| 2007/0061571 | A1 * | 3/2007 | Hammes | G06F 21/31 713/168 |
| 2007/0150348 | A1 * | 6/2007 | Hussain | G06Q 30/02 705/14.54 |
| 2011/0252229 | A1 * | 10/2011 | Belenkiy | H04L 9/0841 713/155 |
| 2013/0212385 | A1 * | 8/2013 | Schechter | G06F 21/31 713/168 |

\* cited by examiner

*Primary Examiner* — Arvin Eskandarnia
(74) *Attorney, Agent, or Firm* — Anderson Gorecki LLP

(57) ABSTRACT

A remote data protection network provides a blind hashing service. A blind hashing server receives a message such as a digest from a client, and uses the message to derive a set of indices or offsets into a huge block of random data that is maintained by the remote data protection network. The corresponding extents of data in the block are combined, e.g. using a hash or HMAC function, and then returned to the invoking client, e.g. as a salt. The message and response may be salted with a unique client salt.

26 Claims, 6 Drawing Sheets

REMOTE BLIND HASHING

CROSS-REFERENCE TO RELATED APPLICATIONS

This patent application is a continuation-in-part of U.S. patent application Ser. No. 13/944,743, filed Jul. 17, 2013, now pending, entitled BLIND HASHING, which is a non-provisional of U.S. provisional patent application 61/673,185, filed Jul. 18, 2012, entitled SECURE STORAGE OF PASSWORD HASHES and U.S. provisional patent application 61/729,145, filed Nov. 21, 2012, entitled BLIND HASHING, each of which is incorporated by reference.

BACKGROUND

This disclosure relates generally to computer and network security. Computers which are interconnected via communications networks are now widely used in commerce and government operations. Although networked computers enable performance of a wide variety of useful tasks, they also create vulnerability to remote attacks from other computers. This is problematic because the computers and networks operated by organizations such as businesses and government may store sensitive data and include software which can be used to control operation of physical devices and financial transactions. Consequently, it is desirable to repel attempts by attackers to gain access to computers and computer networks.

A widely used technique for preventing attackers from gaining access to computers and computer networks is password authentication. Password authentication is a process by which a login attempt to a computer or network is authenticated by determining whether a password and username provided by the computer attempting to login are valid. For example, a user attempting to gain access to a host site may be prompted to send their username and password to the host site. The host site would then determine whether the username and password match a username and corresponding password previously stored by the host site. If a matching username and corresponding password are found then access to the host site is granted. If a matching username and corresponding password are not found then access to the host site is denied.

Password authentication has some vulnerabilities which may enable an attacker to gain access by posing as a legitimate user. For example, weak usernames and passwords may be susceptible to being guessed by an attacker. Human beings tend to select weak usernames and passwords that can be easily committed to memory, such as words or combinations of words in human language. This renders password authentication vulnerable to so-called "dictionary attacks" where an attacker uses a database, such as an English language dictionary, to repeatedly attempt to gain access to a host site using different combinations of database entries until a valid username and corresponding password are found. Another vulnerability is that usernames and passwords can be stolen. For example, an attacker may gain access to a host site and obtain the stored usernames and passwords of multiple users. These vulnerabilities may be exploited in combination, e.g., by stealing usernames and guessing the corresponding passwords via a dictionary attack.

Hashing can be used to mitigate some of the vulnerabilities of password authentication by eliminating host site storage of passwords. For the purposes of the present disclosure, a cryptographically secure hash function, sometimes referred to herein simply as a "hash function," is a one-way function that maps any variable amount of input data into a fixed-size output value referred to herein as a digest. Different input data results in different digests, and small changes to the input data do not necessarily correspond to small changes in the resulting digest. A host site may hash data such as passwords so that the passwords are not stored in the clear. When the user sends a password to the host site at login, the host site applies the hash function to the received password to generate a new digest. The host site attempts to find a matching digest associated with the username in a set of stored password digests. Thus, an attacker who gains access to the host site may steal password digests, but not passwords stored in the clear. However, while a hash function is considered effectively irreversible, i.e. that it is not possible to compute the original data from only its digest, there are other known ways by which the original data such as a password can be recovered.

One limitation with protecting passwords by hashing is that an attacker may steal usernames and password digests to exploit password weakness to compromise user accounts. As explained above, human beings tend to select passwords that can be committed to memory, such as words. Further, multiple users may select the same word or words as their password. This is problematic because those matching passwords result in the same digest. Matching digests may be identified from stolen password digests and the users with matching digests may be targeted by an attacker. For example, the attacker may learn the password of one of the users using other means, such as a "spear phishing attack," and then use the password to gain access to accounts of the other users who use the same password as indicated by the matching digests.

One way to improve the strength of passwords selected by human beings is by salting. Salting is a technique for randomly or pseudo-randomly modifying an input. In one example, unique random strings referred to as a "salts" or "keys" are combined with passwords so that hashing does not generate matching digests even if the passwords selected by multiple users match. In another example a keyed hash function uses the password and the salt as separate arguments or inputs. The keyed hash function may combine the password and the salt in a way that is more rigorous than appending the salt to the password. Regardless of which salting technique is used, when creating a user account the user may be asked to enter a username and a password. The host site receives the username and password from the user and generates a unique salt which is combined with the password and hashed to generate a digest. The host site stores the username, the salt, and the digest. The host site may discard the password so that it is not vulnerable to being stolen in the clear. When the user later attempts to login to the host site, e.g. to access a password protected computer system, the user provides their username and password to the host site password authentication system. The password authentication system attempts to authenticate the login attempt by using the received username to retrieve the corresponding salt and digest. The password authentication system combines the retrieved salt with the password received from the user using the same technique as when the password was initially entered. The password authentication system applies the hash function to the salted password to produce a new digest. The password authentication system compares the new digest to the retrieved digest. If the new digest and the retrieved digest match, the login attempt is determined to be valid. If the new digest and the retrieved digest do not match, the login attempt is determined to be invalid.

Password authentication systems which use salting and hashing as described above are still vulnerable to attack. For example, an attacker may gain access to the host site and steal stored usernames, salts and digests. Later, on an attacker computer, the attacker can then repeatedly attempt to authenticate possible passwords using the stolen usernames, salts and digests in an "offline attack" until the attacker finds at least one salted password that hashes to a stolen digest. The attacker can then use that information to gain access to the host site.

SUMMARY

All examples and features mentioned below can be combined in any technically possible way.

In accordance with an aspect an apparatus comprises: at least one physical storage device comprising a huge block of random data; and a blind hashing device configured, responsive to a message from a client device which is remote from the blind hashing device and the at least one physical storage device, to access the block of random data to obtain at least one extent of random data as a function of a value in the message, and to provide to the client device a response based on contents of the at least one extent of random data. In some implementations the block of random data comprises a pseudorandom sequence where the seed is retained, and all or any part sequence can be regenerated from the seed. In some implementations the block of random data comprises a pseudorandom sequence where the seed is destroyed, and the sequence is backed up in its entirety. In some implementations accessing the block of random data by the blind hashing device comprises using the block as a lookup table. In some implementations an index or offset into the table is determined from the value in the message. In some implementations the value in the message includes a digest generated from a password. In some implementations the password is salted prior to being hashed to generate the digest. In some implementations the response comprises the contents of the at least one extent of random data. In some implementations the response comprises the hash or salted hash of the contents of the at least one extent of random data. In some implementations the value in the message is salted with a unique client salt prior to accessing the block of random data. In some implementations accessing the block of random data comprises multiple iterations of obtaining extents of data from the block of random data. In some implementations a set of indices or offsets into the random block of data are determined from the value in the message. In some implementations one or more of the indices or offsets into the random block of data are determined, in part, by previously retrieved extents of data from the block of random data.

In accordance with another aspect an apparatus comprises: a blind hashing server device configured to: receive a message from a client device which is remote from the blind hashing server device; access a huge block of random data stored in a non-transitory computer-readable storage medium to obtain at least one extent of random data as a function of a value in the received message; and provide to a client device a response based on contents of the at least one extent of random data. In some implementations the block of random data comprises a pseudorandom sequence where the seed is retained, and all or any part sequence can be regenerated from the seed. In some implementations the block of random data comprises a pseudorandom sequence where the seed is destroyed, and the sequence is backed up in its entirety. In some implementations accessing the block of random data by the blind hashing device comprises using the block as a lookup table. In some implementations an index or offset into the table is determined from the value in the message. In some implementations the value in the message includes a digest generated from a password. In some implementations the password is salted prior to being hashed to generate the digest. In some implementations the response comprises the contents of the at least one extent of random data. In some implementations the response comprises the hash or salted hash of the contents of the at least one extent of random data. In some implementations the value in the message is salted with a unique client salt prior to accessing the block of random data. In some implementations accessing the block of random data comprises multiple iterations of obtaining extents of data from the block of random data. In some implementations a set of indices or offsets into the random block of data are determined from the value in the message. In some implementations one or more of the indices or offsets into the random block of data are determined, in part, by previously retrieved extents of data from the block of random data.

BRIEF DESCRIPTION OF THE DRAWINGS

FIG. 3 is a process flow diagram showing login authentication with remote blind hashing.

DETAILED DESCRIPTION

Figure 1:
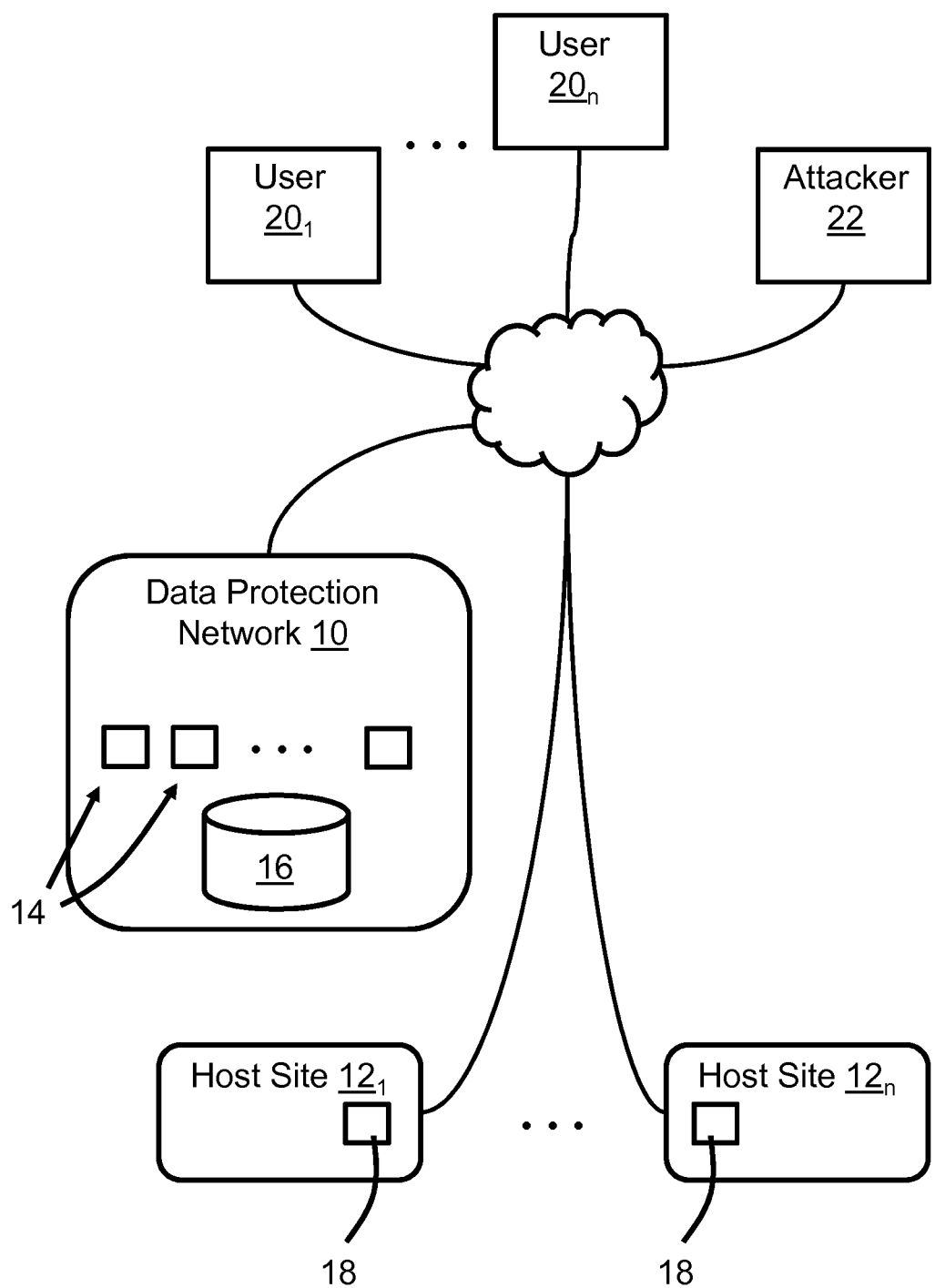
FIG. 1 is diagram of interconnected computers and networks in which a data protection network provides remote blind hashing for host sites.

FIG. 1 is diagram of interconnected computers and networks in which a data protection network 10 provides remote blind hashing for one or more host sites $12_1$-$12_n$. Implementations of the data protection network may include one or more clusters of blind hashing servers 14 and an array of storage devices represented as volume 16. At least one huge block of random data is stored on the volume 16. For the purposes of this disclosure a huge block of random data may be of a size that would be impractical or undesirable for an average enterprise to maintain. In view of ongoing improvements in storage technology the size of a huge block of random data is not necessarily fixed. Also for the purposes of this disclosure a remote computer or network has a different security regime from the computer or network from which it is remote. For example, the remote computer or network has a separate system to protect information and system resources with respect to confidentiality and integrity than the computer or network from which it is remote.

In one implementation the data protection network provides remote blind hashing for password authentication servers 18 of the host sites. Remote blind hashing enables the host sites to authenticate users $20_1$-$20_n$ and repel an attacker 22. However, a wide variety of implementations are possible, including but not limited to symmetric key encryption, revocable encryption keys, and other data encryption and secure data storage techniques. The computations performed by the blind hashing servers may have the property that when the same input is provided by the same host site multiple times, the same output is returned each time. Further, for two different inputs, the corresponding outputs are uncorrelated. Further, it is not possible for a host site to discover the underlying bytes of which the data block is composed. Further, it is not possible for one host site to use their blind hashing results to attack another host site.

The blind hashing servers 14 of the data protection network 10 may perform remote blind hashing by using the huge block of random data as a lookup table. In some implementations a BHA (blind hashing algorithm) implemented by the blind hashing servers uses a message received from a host site as an index, or offset, into the block of random data. The index or offset is used to retrieve one or more corresponding extents of data found in corresponding locations of the block of random data. Those extents of data, or a hash or salted hash of those extents of data, are then returned to the host site which sent the message and invoked the blind hashing service. The size of the digest and the data block may be determined based on design for optimizing efficiency, security, and other variables. As a simple example, when the digest is only one byte, the data block may be 256 bytes, and the digest may be used directly as an index into the data block. In another, more realistic embodiment, given a 64-byte digest, the data block may be arbitrarily large, e.g. on the order of Gigabytes, Terabytes, Petabytes, or even larger. A larger data pool may provide greater lookup performance due to data being spread across more physical disks because each disk provides I/O access to its share of the pool. A larger data pool may also provide greater security in terms of the amount of data which must be stolen to compromise the system. The 64-byte digest may be an unsigned integer that is divided by the data block length and the remainder may be used as an index into the data block to retrieve successive bytes beginning at that location. The random data block may be implemented as a pseudorandom sequence where the seed is retained, and all or any part sequence can be regenerated from the seed. The random data block may be implemented as a pseudorandom sequence where the seed is destroyed, and the sequence is backed up in its entirety.

The data protection network may be operated by an enterprise as a service to other enterprises, e.g., different enterprises associated with different host sites. In at least one implementation the data protection network provides blind hashing services to each one of a plurality of different password authentication systems associated with different host sites with a single huge random data block. As will be explained in greater detail below, information that a host site gains by calling a blind hashing server can be made to be useless for attacking another host site. Also, the result that a host site obtains from calling the blind hashing server can be made unique to that host site, thereby preventing one host site from authenticating another host site's data.

Figure 2:
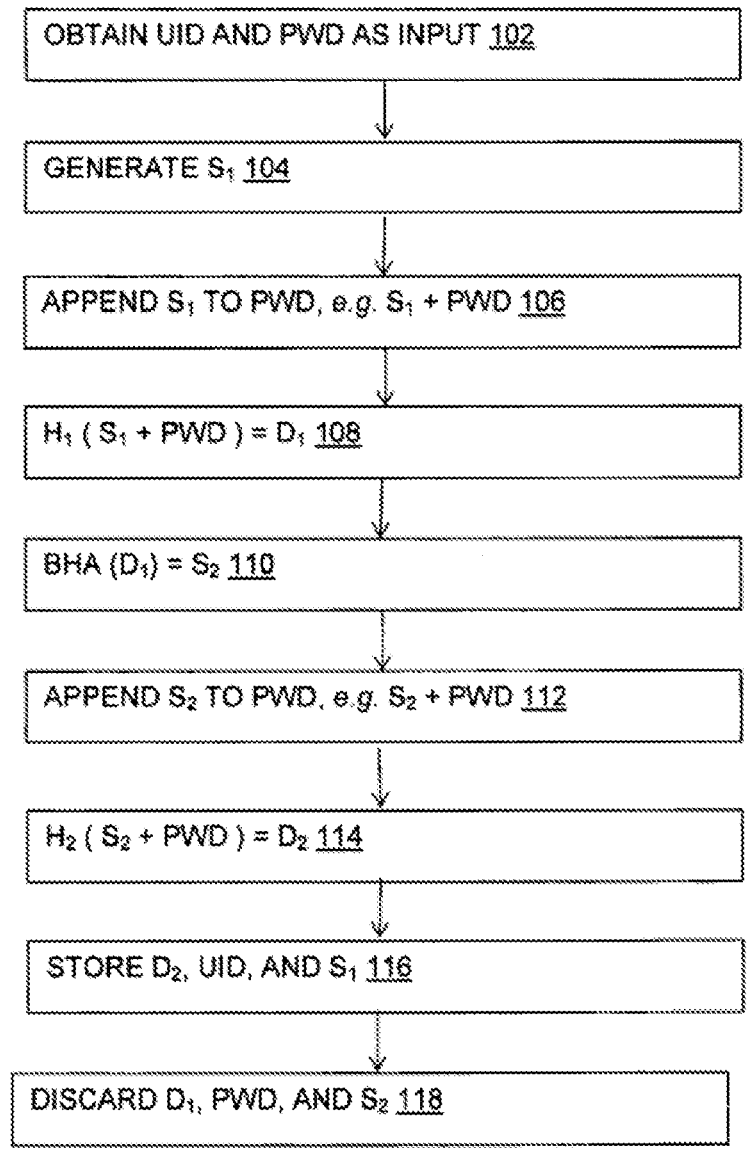
FIG. 2 is a process flow diagram showing user account creation with remote blind hashing.
Figure 2:
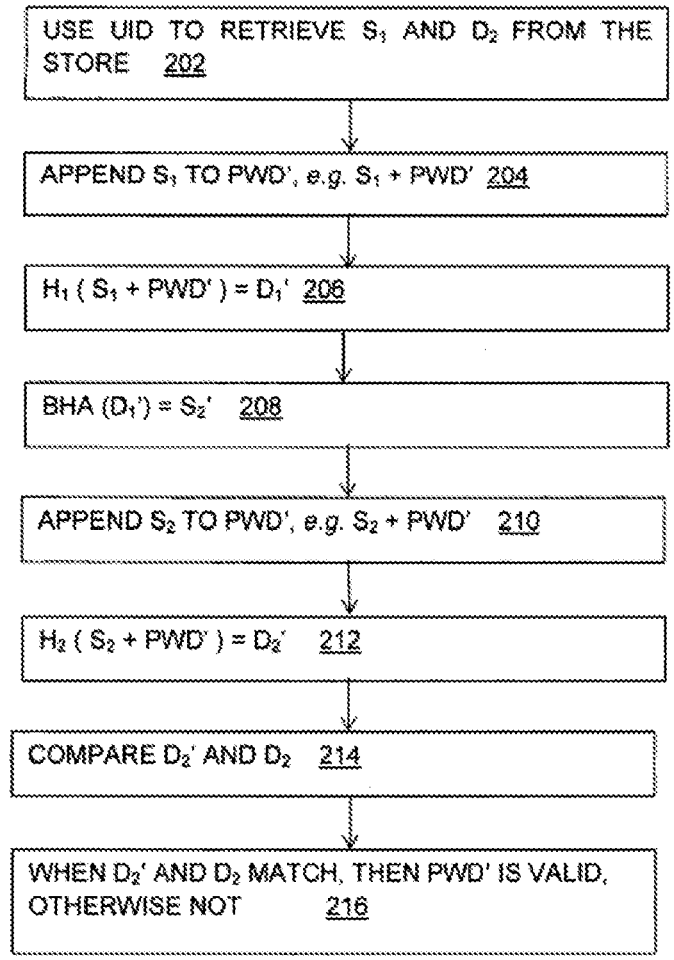

Referring now to FIGS. 1 and 2, when a user wishes to establish a user account with a host site, the host site obtains a user identifier UID and a password PWD from the user as an input at step 102. Next, the host site generates a first salt S1 at step 104. The first salt S1 is used to salt the password PWD. For example, S1 may be combined with the password PWD at step 106. The host site then applies a first hash function H1 to the salted password PWD to generate a first digest D1 at step 108. In another implementation, the first hash function H1 is an HMAC (keyed-hash message authentication code) function taking as its inputs a key and a value, and producing a digest, where the first salt S1 is provided as the key, the password PWD is provided as the value, and the produced digest is the first digest D1. In either implementation, the first digest D1 is then sent from the host site to the data protection network along with a client ID, e.g., of the host site or a host site application. A blind hashing server of the data protection network applies a blind hashing algorithm BHA to the first digest D1 to generate a second salt S2 at step 110, which is returned to the host site. The host site uses the second salt S2 to salt the password PWD, e.g. combines the second salt S2 with the original password PWD provided by the user at step 112. The host site then applies a second hash function H2 to the salted password PWD to produce a second digest D2 at step 114. In another implementation, the second salt S2 may be combined with the first digest D1, in which case the host site then applies a second hash function H2 to the salted first digest to produce a second digest D2 at step 114. The second hash function H2 may be the same or different as the first hash function H1. In another implementation, the second hash function H2 is an HMAC function taking as its inputs a key and a value, and producing a digest, where the second salt S2 is provided as the key, either the original password PWD or the first digest D1, or a combination of the original password PWD and the first digest D1 is provided as the value, and the produced digest is the second digest D2. In another implementation, the second hash function H2 is replaced with a symmetric encryption scheme such as AES taking as its inputs a key and a cleartext value, and producing a ciphertext value, where the second salt S2 is provided as the key, either the first digest D1, or a combination of the original password PWD and the first digest D1 is provided as the cleartext value, and the produced ciphertext is taken as the second digest D2. In one implementation the host site stores the second digest D2, UID, and first salt S1 at step 116. The PWD, first digest D1, and second salt S2 may be discarded by the host site at step 118.

In some implementations, it may be desirable for the host site to recover the original first digest D1 which was discarded by the host site at step 118, for instance if the random data block is compromised, corrupted, lost, shut down, blocked or otherwise unavailable, or if the random data block is regenerated from a new pseudorandom sequence, or if blind hashing is no longer desired. Those skilled in the art will appreciate that any mechanism which allows recovering the first digest D1 effectively bypasses the blind hashing algorithm, and as such must not be available to an attacker. In one implementation the host site uses an asymmetric cryptographic protocol, e.g. RSA, and public/private keypair, to encrypt the first digest D1 using a public key, and produce an encrypted first digest D1'. The encrypted first digest D1' may be stored by the host site along with the second digest D2, UID, and first salt S1 at step 116. The PWD, first digest D1, and second salt S2 may be discarded by the host site at step 118. The corresponding private key to the public key used to encrypt D1 may be kept in offline storage, such as a safe deposit box, to reduce the risk of theft. The private key may be used to decrypt D1' to recover the first digest D1.

Referring now to FIGS. 1 and 3, when the user subsequently wishes to login to the host site the user provides a user identifier UID' and password PWD' to the host site. The host site uses the user identifier UID' to retrieve the corresponding first salt S1 and second digest D2 from storage at step 202. If no corresponding first salt S1 and second digest D2 exist then the login attempt is rejected. If a corresponding first salt S1 and second digest D2 exist then the host site salts the password PWD' with the first salt S1, e.g. appends the first salt S1 to the supplied password PWD' at step 204. The host site then applies the first hash function H1 to the salted password PWD' to produce a first digest D1' at step 206. The first digest D1' is then sent from the host site to the data protection network along with the client ID, e.g., of the host site or an application. A blind hashing server of the data protection network applies the blind hashing algorithm to the first digest D1' to generate a second salt S2' at step 208, which is returned to the host site. The host site uses the second salt S2' to salt the supplied password PWD', e.g. appends the second salt S2' to the provided PWD' at step 210. The host site then applies the second hash function H2 to the salted password PWD' to produce a second digest D2' at step 212. Lastly, the host site compares the second digest D2' to the second digest D2 retrieved from storage. If the digests D2, D2' match, the PWD' is valid, otherwise not as indicated at step 216.

Figure 4:
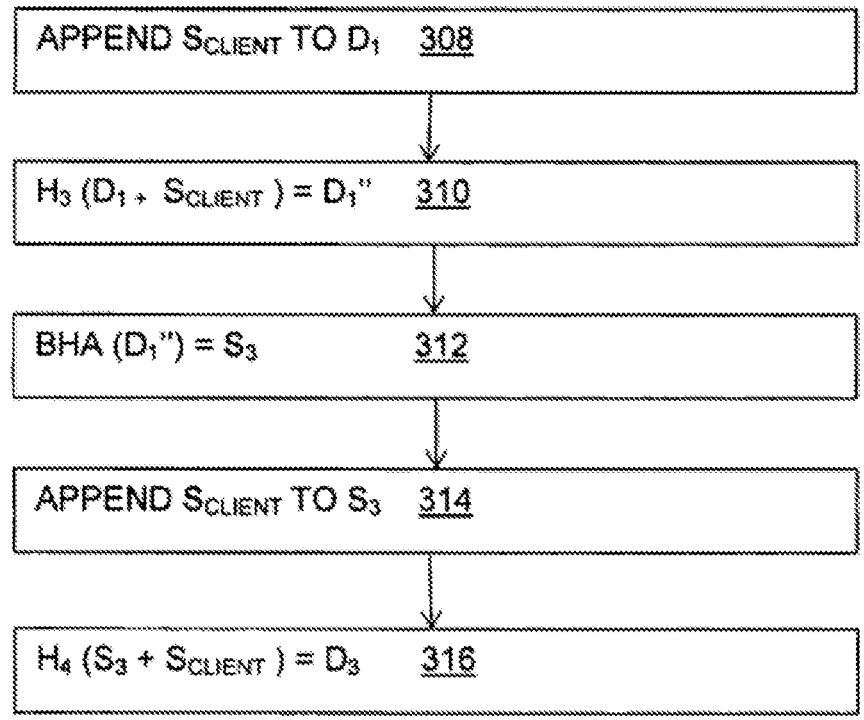
FIG. 4 is a partial process flow diagram showing how the data protection network distinguishes between host sites.

FIG. 4 illustrates use of client salts to provide separation between clients which utilize the same block of random data. Before performing a data block lookup, e.g. after step 108 (FIG. 2) or step 206 (FIG. 3), the blind hashing server combines to its first digest input (D1 or D1') a host site client salt $S_{CLIENT}$ uniquely associated with the host site which invoked the remote blind hashing service as shown at step 308. The blind hashing server then applies a hash function to produce from the salted first digest a new digest D1", and uses D1" as an index into the data block to retrieve a third salt S3 as shown at step 312. The blind hashing server then appends the client salt $S_{CLIENT}$, or some other salt, to the third salt S3 at step 314. The blind hashing server then applies a hash function H4 to (S3+$S_{CLIENT}$) to produce a new digest D3 that the blind hashing server uses as the second salt output S2, S2' as shown at step 316. This helps to protect the blind hashing data block from discovery, which could occur, for example, if a host site client saved inputs and outputs over many blind hashing requests or if an attacker made probing requests to the data block and siphoned off the results. It also helps to ensure that the retuned second salt data is unique to each client, because the digests and salts are dependent on client data, thereby preventing identical passwords for two different clients from having the same digest. It also helps to prevent one client from performing blind hashing on another client's data.

To further protect the data block from an attacker some implementations of the blind hashing algorithm include multiple iterations of a data block lookup, e.g. using the data retrieved from each iteration to derive the index for the next iteration. In some implementations data is retrieved from a sequence of indices and the retrieved data is combined with a hashing function. In general there are two techniques to derive indices. A first technique is using data from the client, e.g., digest D1, or a hash or salted hash of D1. A second technique is using data extents from the data block. The first technique may provide higher performance because lookups may be performed in parallel, whereas in the second technique lookups are performed in series because the location of one lookup depends, at least in part, on data extents retrieved in a prior lookup. It is also possible to use a combination of both techniques, e.g., perform some lookups in parallel and some in series. Examples could include 8×8 and 16×4, where 8×8 includes 8 lookups in parallel, each of which is used to perform 8 further lookups in series. 16×4 includes 16 lookups in parallel, each used to perform 4 lookups in series. Both examples total 64 lookups altogether. The number of lookups, and the degree of parallelism can be configured separately for each Client/ClientID.

In some implementations the digest (D1, D1', or D1") is split into two or more unsigned integers that are each divided by the data block length, and each remainder may be used as separate indices into the data block to retrieve successive bytes beginning at that location. In some implementations, the digest (D1, D1', or D1") is further hashed, or salted and hashed, to derive additional pseudorandom indices to perform further lookups into the data block. In some implementations, the data retrieved from the data block in one lookup may be an unsigned integer that is divided by the data block length and the remainder may be used as an index into the data block to retrieve successive bytes beginning at that location.

The practices described above may increase exponentially the amount of the data block which must be stolen before it is useful to an attacker. For example, if only a single lookup were used, and if 75% of the data block were stolen, then 75% of the indexes would point to data that are available to the attacker and the lookup succeeds 75% of the time. If instead eight lookups were performed, while each lookup still has a 75% chance of success, obtaining the correct result requires all eight lookups, a success rate of $(0.75)^8$ or only about 10%. If 256 lookups are used, and 98% of the data block is stolen, the attacker would still have only a 0.5% chance of being able to generate a salt for any given digest. Performing multiple lookups effectively amplifies the impact of any missing data in the block to the point where it is useless to have less than the entire data block.

Figure 5:
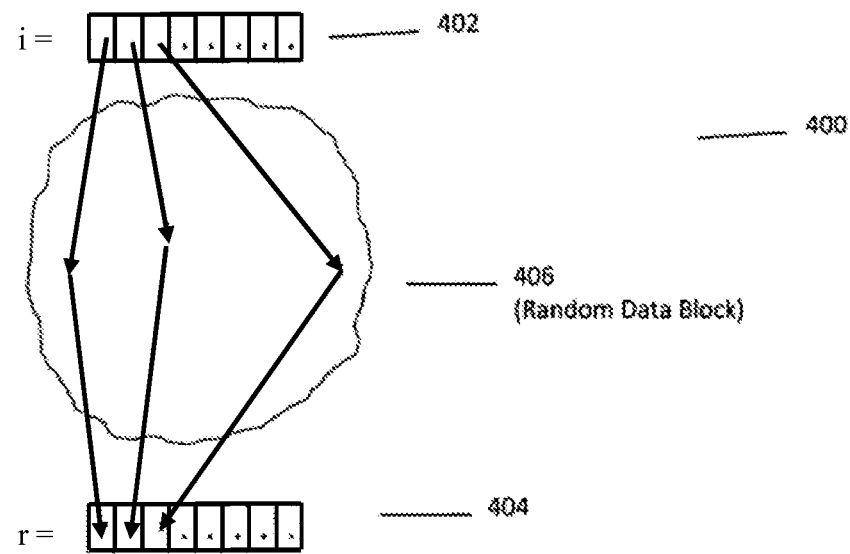
FIG. 5 is a schematic diagram showing how blind hashing uses a huge block of random data.
Figure 6:
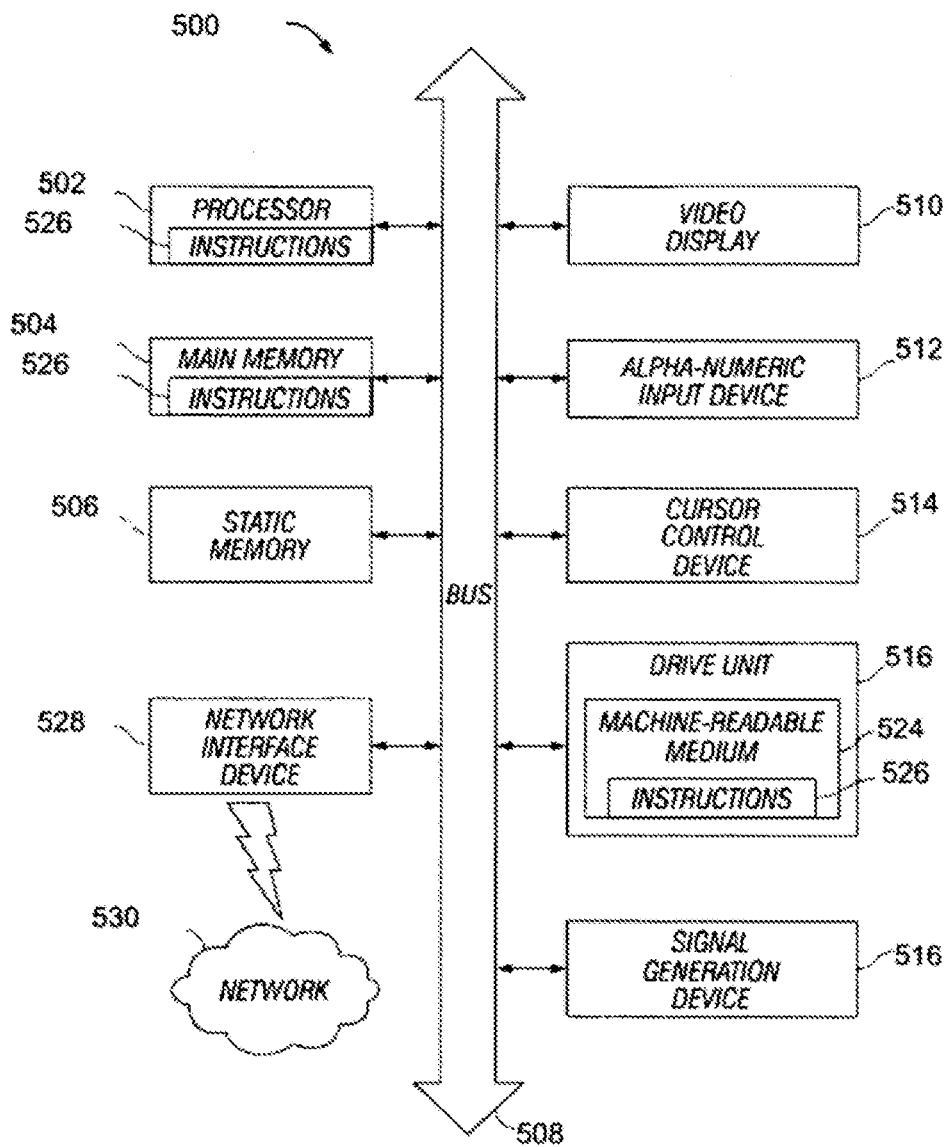
FIG. 6 is a block schematic diagram of a remote blind hashing system in the exemplary form of a computer system.

FIG. 5 illustrates an exemplary blind hashing random data block. The example is not meant to be limiting. One skilled in the art could readily construct other uniformly random distributed data blocks using the fundamental principles set forth herein. In the illustrated example, 'i' represents an indexer value 402 and r represents a pseudorandom value 404 being pulled out of a data block 406. Different 'i' values produce uniformly random distributed data. The 'r' values may be uncorrelated. However, a single 'i' will always return the same 'r'. In other words, the blind hashing algorithm is deterministic. In some implementations 'i' (indexer value 402) may be split into 64-bit values to be used as indices. Splitting up 'i' (indexer value 402) may be one way to meet the two properties described above. In some implementations 'i' (indexer value 402) need not be directly entered by the client, e.g. a client site or application, but rather extrapolated from client input in a similarly deterministic fashion. For example, the blind hashing mechanism may hash input from the client, e.g. to ensure that clients do not have complete control over what value 'i' takes. For example, in an embodiment, 'i' may be the second digest D2, or D2 may be calculated by taking the salted hash of 'i' with 'i' as the data, and the client salt ($S_{CLIENT}$) as the key, or using another salt associated with $S_{CLIENT}$ as the key.

In an illustrative example which should not be viewed as limiting, a blind hashing server of the data protection network takes as input from an invoking client host site a first digest, D1 110 or D1' 208, which may be a 512-bit (64-byte) number, and uses this first digest value as an index into the data block, referred to herein as the indexer 402. In some implementations the blind hashing server appends a client salt $S_{CLIENT}$ 308 to the first digest. As already described above, the client salt is uniquely associated with the invoking client. The blind hashing server then applies a hash function to produce from this salted first digest a new digest D1", and uses D1" as an index into the data block, referred to herein as the indexer 402. If it is desired that the salt to be returned, e.g. S2, is a 64-byte number, then the 512-bit number may be split, e.g. i 402, into eight 64-bit addresses. Each 64-bit address may then be used as an index into the array, e.g. random data block 406, to retrieve 8 bytes of data, e.g. r 404, retrieved from that index onwards. The eight 8-byte values, r 404, retrieved from random data block 406 are combined to form a 64-byte value which is returned to the user or client.

Both the client salt $S_{CLIENT}$ and the first digest D1 may be used to determine the salt value that is retrieved. Although this is not a required property, it may be useful to prevent one host site from attacking another host site. For example, if different client salts $S_{CLIENT}$ result in different responses, e.g. S2's, for the same D1, and host site client A, knows the D1 of host site client B, such knowledge still does not enable client A to obtain the same response as would client B. Use of unique client salts $S_{CLIENT}$ may make it easier to rate limit potential attackers based on the $S_{CLIENT}$ as an identifier. Blacklisting a specific $S_{CLIENT}$ may be used to prevent attempts of others to retrieve a salt using that $S_{CLIENT}$, which may be referred to as revocable encryption, discussed in further detail hereinbelow. Thus, host sites are protected from one another while relying on the same random block of data.

In some implementations blind hashing may be used for symmetric key encryption. A password is typically hashed and its digest used as the encryption key when encoding a message using symmetric key encryption. The key is used to encrypt the message and is thereafter discarded. The encrypted message may be decrypted only by someone or some entity who knows the password and can hash that password to recreate the key. However, if the encrypted message is stolen by a determined attacker, the attacker can possibly decrypt the message using a "brute force" attack by trying different possible passwords until the attacker finds the right password. For example, an attacker might start with a list of the 100 billion most likely passwords. For each password in the list, the attacker hashes the password, decrypts the message using the resulting digest as the key, and checks for telltale signs that the decryption was successful. Blind hashing helps to repel this kind of brute force attack. As mentioned previously, in some implementations using blind hashing to encrypt a message includes generating a first salt, appending the first salt to the password, and applying the hash function to produce from that salted password a first digest, such as described earlier while creating a user account in steps 104, 106, and 108. Next, and as also depicted in FIG. 1, the blind hashing algorithm produces from that first digest a second salt such as for example as shown in step 110. The second salt is combined with the original password such as for example in step 114. The hash function (or a different hash function) is then applied to produce a second digest, such as for example also as shown in step 114, that may be used as the encryption key. The first salt is combined with the encrypted message such as for example but not limited to placing the first salt at the beginning of the encrypted message. Both digests and the second salt are discarded. When using blind hashing to decrypt a message that has been encrypted as described above, the computer strips off the first salt that was combined with, e.g. placed at the beginning of, the encrypted message. Then the stripped off first salt is combined with the password such as for example as shown in FIG. 2 at step 204. The hash function is applied to produce from this salted password a first digest for example as shown at step 206. Next, the blind hashing algorithm is applied to produce from that first digest a second salt as shown for example at step 208. That second salt is combined with the provided password for example as shown at step 210, the hash function or the different hash function is applied to the second-salted password to produce a second digest as shown for example at step 212. Finally the second digest is used as the decryption key.

In some implementations blind hashing may be used for generation of a revocable encryption key that allows the encoded message to be decrypted only up until such time as someone chooses to make it thereafter indecipherable. For example, when the confidential documents in an embassy are encrypted using blind hashing, simply revoking the keys during an attack on the embassy can make or render the documents that use those keys substantially impossible to decode. Consequently, the encrypted documents themselves need not be destroyed. Revoking a set of keys may include simply instructing the data protection network to disable the set of salts uniquely associated with the client who created those keys or associated with the client ID that was used to create the set of salts. A set of keys may be revoked by blacklisting the client salt that was used by the blind hashing process when the keys were created. Thus, when the client salt is later re-enabled, e.g. after the embassy attack has been thwarted, the documents encrypted by those keys can once again be decoded. It should be appreciated that this embodiment may not be fully secure because an attacker who steals the entire blind hashing server could themselves re-enable the client salt.

In some implementations each client salt is replaced with a corresponding secret salt during the blind hashing process. A set of keys may be revoked by destroying the secret salt used when the keys were created. This approach is secure. However, it should be appreciated that it will be forever impossible to decode the documents that were encrypted using that key, even when the correct password is known.

In some implementations, the host site stores the encrypted first digest D1', the second digest D2, UID, and the first salt S1 (as in [0023]), and the blind hashing server keeps a corresponding secret salt for each client salt (as in [0034]). The combination of the host site keeping the encrypted first digest D1', and the blind hashing server keeping a secret salt corresponding to the client salt, allow perfect recovery from any attacker breach of either one of the host site, or the blind hashing server, using the following process; the blind hashing service first destroys the corresponding secret salt for the host site's client salt, and then generates a new secret salt corresponding to the host site's client salt, the blind hashing server may then regenerate any portion or all of the random data block with new pseudo-random data (as in [0020]). The host site then retrieves its first private key, generates a second public and private keypair and then, for each stored first digest D1', uses its first private key to decrypt the encrypted first digest D1' to recover the first digest D1, and then returns to step 108 of the user enrollment process in [0022] to produce a new second digest D2 and a new encrypted first digest D1' using the second public key, and stores the new D1' and D2 in place of the existing D1' and D2, and finally the host site destroys its first private key. This process ensures it will be forever impossible for an attacker to recover even a single password or decode any documents from data previously accessed by the attacker on either the host site or the blind hashing service. It will be appreciated by one skilled in the art that this process may be performed retroactively after discovering a breach, or proactively on a regular basis to guard against even undetected breaches.

In some implementations the end user or host site is charged based on the number of requests made using a particular UID. This can make it economically less attractive to try to siphon data. For example, given a 100 TB data block, a system would need to make 312 billion requests, each returning 32-bytes, to siphon off 10% of the data block. Assuming a charge of $0.01 per user and allowing 1000 logins per year for each user, such parameters may in effect be a charge of $1 per 100,000 requests. In this case the attacker has to spend $3,125,000 to run 312 billion requests.

In some implementations siphoning is prevented by using HMAC. In order to siphon data the attacker is required to know indexer, 'I' 402, and 'r' value 404, which is retrieved from random data block 406. The attacker's ability to even see 'r' may be eliminated by adding another hash function computation 316. For example, a hash function could be applied to 'r' and $S_{CLIENT}$, returning the resulting value as the salt. When 'r' 404 is uniformly randomly distributed and uncorrelated with the indexer, i 402, then H ($S_{CLIENT}$, r) also shares such two properties. An attacker would then only know $S_{CLIENT}$ and the salt from the equation H ($S_{CLIENT}$, r)= salt, and recovering r in this case, where r is a random 64-byte value, might be computationally impossible for several decades.

Some implementations may include client access control. Each client may have their own 64-byte client salt or ID which the data protection network randomly generates. This value may be sent to the blind hashing server over a secure channel at the start of each session to authenticate the client.

The blind hashing network may allow clients to configure various access rules based on their client IDs. An example is an IP white list of IP addresses which are allowed to run Salt requests to invoke blind hashing on a specified ID. Another example is a geographic whitelist of locations determined by GeoIP lookup, which are allowed to run Salt requests on that ID. Another example is time-based access control which only allow Salt requests at certain dates or times or after a certain date and/or time. Another example is multi-factor access control which only allow Salt requests on that ID when a second factor such as a OTP is provided. Another example is event based access control, e.g., only allow Salt requests on that ID after a specific event, such as for example "the next time the Red Sox win the World Series" or "2 weeks after person X dies." Another example is multi-Party access control, e.g., only allow Salt requests when multiple different parties are connected concurrently. It should be appreciated that whatever access control embodiments are implemented and because retrieving the salt is an important aspect in performing a password lookup or decryption operation, preventing a blind hashing algorithm operation may effectively prevent the user login or decryption from succeeding until the access control requirement is met.

FIG. 5 is a block schematic diagram of a system in the exemplary form of a computer system 500 within which a set of instructions for causing the system to perform any one of the foregoing methodologies may be executed. In alternative 20 embodiments, the system may comprise a network router, a network switch, a network bridge, personal digital assistant (PDA), a cellular telephone, a Web appliance or any system capable of executing a sequence of instructions that specify actions to be taken by that system. The computer system 500 includes a processor 502, a main memory 504 and a static memory 506, which communicate with each other via a bus 508. The computer system 500 may further include a display unit 510, for example, a liquid crystal display (LCD) or a cathode ray tube (CRT). The computer system 500 also includes an alphanumeric input device 512, for example, a keyboard; a 30 cursor control device 514, for example, a mouse; a disk drive unit 516, a signal generation device 518, for example, a speaker, and a network interface device 528. The disk drive unit 516 includes a machine-readable medium 524 on which is stored a set of executable instructions, i.e. software, 526 embodying any one, or all, of the methodologies described herein below. The software 526 is also shown to reside, completely or at least partially, within the main memory 504 and/or within the processor 502. The software 526 may further be transmitted or received over a network 530 by means of a network interface device 528.

In contrast to the system 500 discussed above, a different embodiment uses logic circuitry instead of computer-executed instructions to implement processing entities. Depending upon the particular requirements of the application in the areas of speed, expense, tooling costs, and the like, this logic may be 15 implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLO), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Further, it is to be understood that embodiments may include performing operations and using storage with cloud computing. For the purposes of discussion herein, cloud computing may mean executing algorithms on any network that is accessible by internet-enabled or network-enabled devices, servers, or clients and that do not require complex hardware configurations, e.g. requiring cables and complex software configurations, e.g. requiring a consultant to install. For example, embodiments may provide one or more cloud computing solutions that enable enterprises to provide blind hashing mechanisms on such internet-enabled or other network-enabled devices, servers, or clients. It further should be appreciated that one or more cloud computing embodiments may include aspects of blind hashing using mobile devices, tablets, and the like, as such devices are becoming standard consumer as well as computing devices.

Embodiments of the systems and methods described above comprise computer components and computer-implemented steps that will be apparent to those skilled in the art. For example, it should be understood by one of skill in the art that the computer-implemented steps may be stored as computer-executable instructions on a non-transitory computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other embodiments are within the scope of the following claims.

What is claimed is:

1. An apparatus comprising:
    at least one physical storage device comprising a multi-petabyte block of random data; and
    a blind hashing computer configured, responsive to a message from a client computer which is remote from the blind hashing computer and the at least one physical storage device, to access the block of random data to obtain at least one extent of random data as a function of a value in the message, and to provide to the client computer a response based on contents of the at least one extent of random data, wherein an account established with the client computer is authenticated based on the response.

2. The apparatus of claim 1 wherein the block of random data comprises a pseudorandom sequence and the seed is retained.

3. The apparatus of claim 1 wherein the block of random data comprises a pseudorandom sequence where the seed is destroyed, and the sequence is backed up in its entirety.

4. The apparatus of claim 1 wherein accessing the block of random data by the blind hashing computer comprises using the block as a lookup table.

5. The apparatus of claim 4 wherein an index or offset into the table is determined from the value in the message.

6. The apparatus of claim 1 wherein the value in the message includes a digest generated from a password.

7. The apparatus of claim 6 wherein the password is salted prior to being hashed to generate the digest.

8. The apparatus of claim 1 wherein the response comprises the contents of the at least one extent of random data.

9. The apparatus of claim 1 wherein the response comprises at least one of:
    the hash of the contents of the at least one extent of random data; and
    the salted hash of the contents of the at least one extent of random data.

10. The apparatus of claim 1 wherein the value in the message is salted with a unique client salt prior to accessing the block of random data.

11. The apparatus of claim 1 wherein accessing the block of random data comprises multiple iterations of obtaining extents of data from the block of random data.

12. The apparatus of claim 1 wherein a set of indices or offsets into the block of random data are determined from the value in the message.

13. The apparatus of claim 1 wherein one or more indices or offsets into the block of random data are determined, in part, by previously retrieved extents of data from the block of random data.

14. An apparatus comprising:
    a blind hashing server device configured to:
        receive a message from a first client computer which is remote from the blind hashing server device;
        access a multi-petabyte block of random data stored in a non-transitory computer-readable storage medium to obtain at least one extent of random data as a function of a value in the received message; and
        provide to a second client computer a response based on contents of the at least one extent of random data, wherein an account established with the first client computer is authenticated based on the response.

15. The apparatus of claim 14 wherein the block of random data comprises a pseudorandom sequence and the seed is retained.

16. The apparatus of claim 14 wherein the block of random data comprises a pseudorandom sequence where the seed is destroyed, and the sequence is backed up in its entirety.

17. The apparatus of claim 14 wherein accessing the block of random data by the blind hashing server device comprises using the block as a lookup table.

18. The apparatus of claim 17 wherein an index or offset into the table is determined from the value in the message.

19. The apparatus of claim 14 wherein the value in the message includes a digest generated from a password.

20. The apparatus of claim 19 wherein the password is salted prior to being hashed to generate the digest.

21. The apparatus of claim 14 wherein the response comprises the contents of the at least one extent of random data.

22. The apparatus of claim 14 wherein the response comprises at least one of:
    the hash of the contents of the at least one extent of random data; and
    the salted hash of the contents of the at least one extent of random data.

23. The apparatus of claim 11 wherein the value in the message is salted with a unique client salt prior to accessing the block of random data.

24. The apparatus of claim 11 wherein accessing the block of random data comprises multiple iterations of obtaining extents of data from the block of random data.

25. The apparatus of claim 11 wherein a set of indices or offsets into the table are determined from the value in the message.

26. The apparatus of claim 11 wherein at least one of the indices or offsets into the table is determined, in part, by previously retrieved extents of data from the block of random data.

* * * * *